Patented Oct. 28, 1930

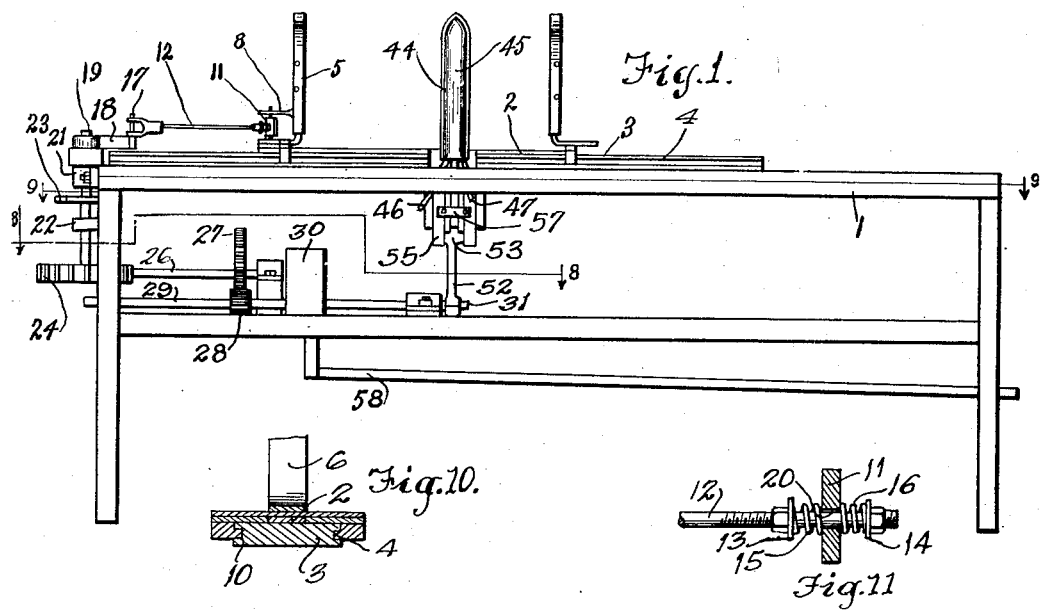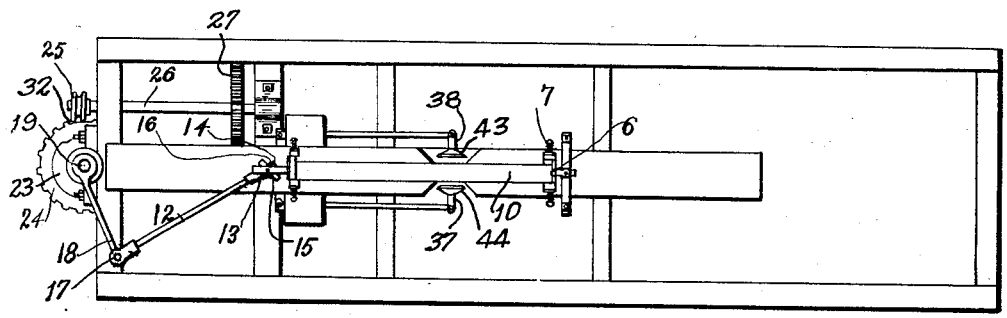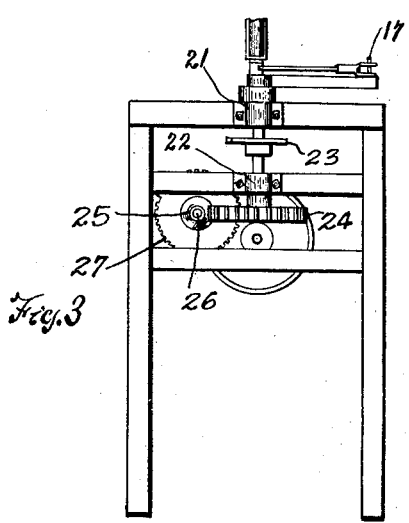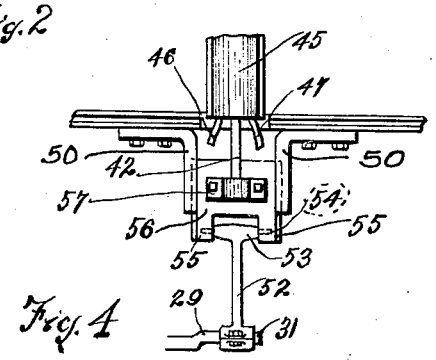

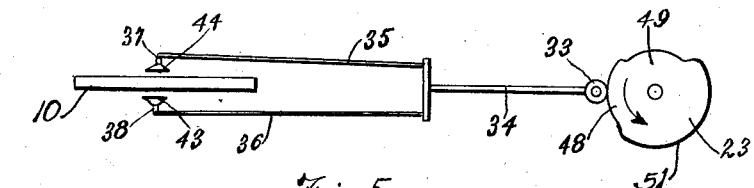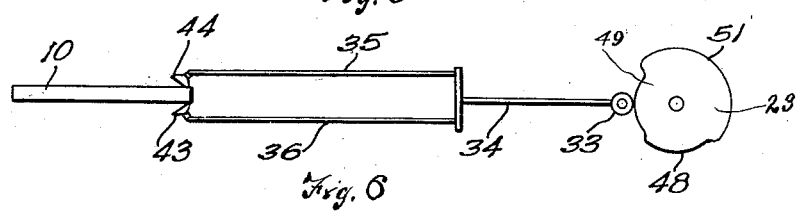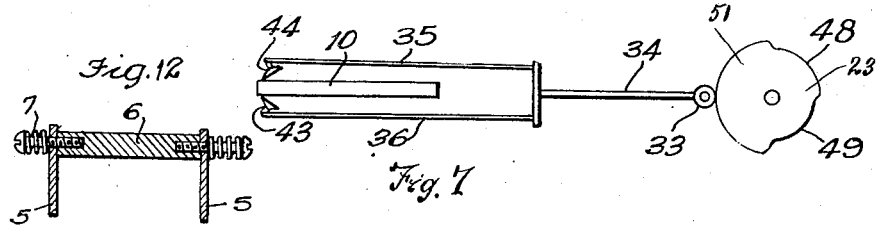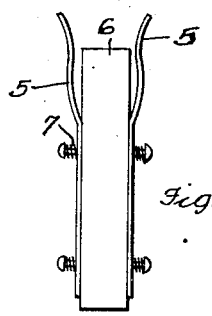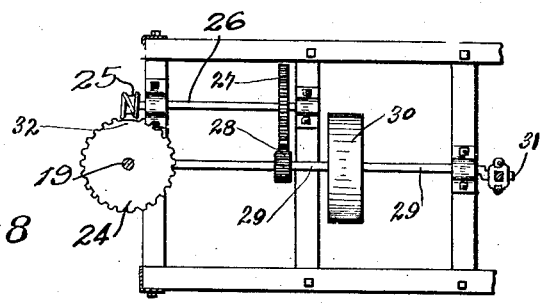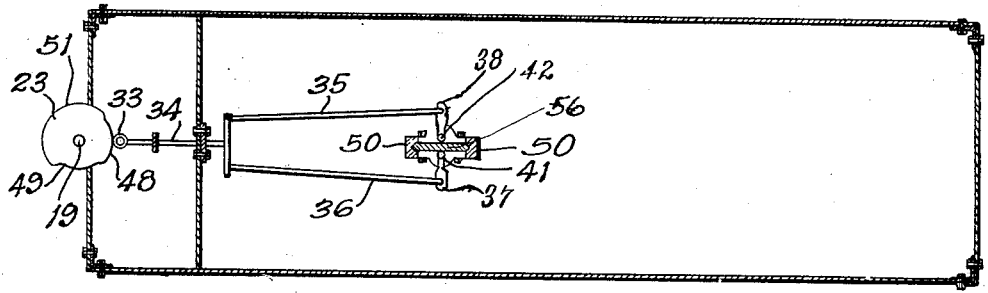

1,779,469

UNITED STATES PATENT OFFICE

WILLIAM T. GRAN, OF JEFFERSON, OHIO

HONEY UNCAPPING APPARATUS AND METHOD

Application filed December 12, 1927. Serial No. 239,371.

This invention as indicated relates to a honey uncapping apparatus and method. More particularly it comprises an apparatus and method for uncapping extractor frames for honey so as to permit the ready removal of the honey from the main body portion of the honey-comb and permitting the recovery of honey from the cap portions of the comb so severed by the apparatus.

Heretofore it has been the practise to use various expedients for removing the caps from the honey-combs, but such devices have, in most instances, been hand operated devices and not adapted for quantity production.

The present apparatus and method are intended for use by producers of honey in large quantities and have in view the provision of means for rapidly removing caps from the combs in the extractor frames so that rapid production of honey may be brought about with a minimum expense for labor and with great saving of time. Other and further objects of the invention will appear in the course of the following description. To the accomplishment of the foregoing and related ends, said invention, then, consists of the means and method hereinafter fully described and particularly pointed out in the claims.

The annexed drawings and the following description set forth in detail certain means and one mode of carrying out the invention, such disclosed means and mode illustrating, however, but several of various applications of the principle of the invention.

In said annexed drawings:

Fig. 1 is a side elevation of one form of apparatus embodying the principles of my invention; Fig. 2 is a top plan view of the apparatus shown in Fig. 1; Fig. 3 is an end elevation of the apparatus; Fig. 4 is an enlarged detail view showing the cutting blade reciprocating means; Figs. 5, 6 and 7 are plan views showing the cam mechanism for changing the position of the cutting blades; Fig. 8 is an enlarged detail view taken along the line 8—8 shown in Fig. 1, looking in the direction of the arrows showing the driving mechanism; Fig. 9 is a horizontal view of the apparatus partly in section, taken along the line 9—9 shown in Fig. 1, looking in the direction of the arrows, showing the mechanism for changing the position of the cutting blades; Fig. 10 is a sectional view of the frame and guide member showing a portion of one of the extractor frame supports; Fig. 11 is an enlarged detailed view partly in section showing the apertured post 11 and the link 12 with the abutments and buffer springs; Fig. 12 is an enlarged sectional view showing one of the end members with the guide flanges and lateral springs resiliently supporting the same; and Fig. 13 is a front elevation of one of the end members with the guide flanges and lateral springs resiliently supporting the same.

As is clearly shown in the drawings, the apparatus comprises a table 1 upon which is supported a horizontally reciprocable frame 2 adapted to engage a central guide member 3 provided with lateral grooves 4 with which tongues 10 on said frame engage. Said frame carries adjacent each end, a pair of upright extractor frame supports, comprising end members 6 and lateral springs 7 resiliently supporting the guide flanges 5 which are adapted to cooperate in engaging the ends of an extractor frame. The construction of the frame and supports is such that the supports may be adjusted by means of suitable bolts to receive an extractor frame 10 in frictional engagement and permit the ready removal of said frame after the apparatus has completed the uncapping operation. Adjacent one end of the reciprocable frame, bearings 8, 9 are provided between which a vertical pivot post 11 is mounted; said post is formed with a central aperture 20 to receive the end of a link 12 which is provided adjacent its end with a pair of spaced abutments 13, 14, between which and said pivot posts, respectively, buffer springs 15, 16 are mounted. The opposite end of the link is connected with a pin 17 on the end of a crank arm 18 mounted on the upper end of the vertical shaft 19 secured in suitable bearings 21, 22 at the end of the table. The crank arm on said shaft is mounted immediately above the top surface of the table and immediately beneath the table top said vertical shaft carries a cam wheel 23 for a purpose presently to be indicated. Adjacent the lower end of the vertical shaft a worm wheel 24 is provided, the teeth of which are engaged by a worm 25 mounted on a shaft 26 carrying a large gear 27 engaged with a pinion 28 on the drive shaft 29 of an electric motor 30. The opposite end of said motor shaft 29 carries a crank arm 31 adapted to reciprocate the cutting blades as will be hereinafter explained.

The worm gear as illustrated has two teeth omitted at one point 32 about its periphery at which point the extractor frame shifting mechanism will come to rest at a position when the cutting blades are at the longitudinal middle of the extractor frame. When in this position the cutting blades will be turned in parallel relation with the side edges of the extractor frame. In order to bring the cutting blades into operative relation with the caps on the honey-comb, a blade shifting mechanism is provided as is more particularly illustrated in Figs. 5, 6, 7 and 9. Said mechanism comprises a roller 33 mounted on the end of a shifting bar 34 with which two links 35, 36 are connected, the free ends of said links being engaged through apertures in the short crank arms 37, 38 secured to the cutting blade supports. The cutting blades are carried on vertical standards 41, 42 from which said short crank arms project laterally adjacent their lower ends. Said standards carry immediately above the top surface of the table the cutting blades 43, 44. Said blades are provided with jackets 45 with which suitable flexible heating conduits 46, 47 are connected, and through which hot water or steam may be circulated to maintain each of said cutting blades in heated condition so that more effective action may be had in severing the wax caps from the honey-comb. As is clearly shown in Fig. 5 of the drawing, the cam wheel 23 has a cam sector 48, adapted to hold the blades in position parallel to the sides of the extractor frame; and, adjacent to said sector 48, it has a sector 49, adapted to turn said blades with their rearward edges canted toward the honey-comb; also, as is shown in Fig. 6, adjacent the last-mentioned sector 49, it has a cam sector 51, adapted to turn said cutting blades in exactly the opposite direction toward the honey-comb, so as to bring their opposite edges into cutting action against the caps of said honey-comb, as is shown in Fig. 7. The relative position of the blades and the cam sectors is diagrammatically indicated in Figs. 5, 6 and 7 as the exact contour and proportions of the cam is not shown, but the approximate outline is indicated for the purposes of illustration.

In addition to the reciprocating means for the extractor frame and the blade turning means above described, the apparatus includes means for rapidly reciprocating the cutting blades. This apparatus is more particularly shown in Fig. 4 of the drawing which shows a link 52 mounted on the crank arm 31 at one end of the motor shaft 29 heretofore described. Said crank arm is provided with a sleeve 53 adjacent its upper end within which a pin 54 is engaged. The ends of said pin are secured in downwardly projecting ears 55 of a slide 56 within which the vertical supports 42 of the cutting blades are rotatably journalled by means of separable bearing plates 57. The slide 56 is engaged in guide brackets 50 attached to the under side of the table. As the crank arm 31 is rapidly actuated, it is obvious that the slide and the associated cutting blades will be rapidly reciprocated. The crank arm 31 is of very short throw and is directly connected with the electric motor so that very rapid reciprocation will result.

While the operation of the mechanism has already been partly indicated, a brief description of the various steps will now be set down. With the reciprocable frame in an approximately central position as shown in Figs. 1 and 2, an extractor frame is engaged between the vertical supports 5 and held in position by means of the resiliency of said vertical members. The operator then manually shifts the worm gear on the vertical shaft to engage the same with the worm and throws the switch to the motor to the operative position. The motor will immediately reciprocate the cutting blades and will rotate the vertical shaft with its associated crank arm and cam wheel. As the crank arm is moved, it will first draw the recpirocable frame toward the end of the table carrying the vertical shaft and the cam wheel during this operation will turn the rearward edges of the cutting blades toward the honey-comb so that the caps on the last section of the extractor frame will be simultaneously removed from each side of the honey-combs at the rearward portion of the extractor frame. As the extractor frame is moved to its limit of motion in a direction toward the end of the table carrying the vertical shaft, the cam sector 51 will be brought into action and the cutting blades will be reversed in position. The crank arm will then move the extractor frame in the opposite direction and the cutting action by reciprocating blades will take place over the remaining portion of the extractor frame each side of said frame having the caps removed simultaneously through the reciprocating action of the heated cutting blades. The severed caps will fall from the blades into a pan 58 secured beneath the table and preferably inclined toward the end of said table opposite that end carrying the vertical shaft.

In addition to the apparatus just described, the invention includes the method of simultaneously removing the caps from the honey-comb on opposite sides of said comb for subsequently separating the honey from said caps. Through the use of reciprocating heated knives and a positive feed of the caps against the inclined edges of the cutting blades, a very rapid rate of production is secured and for large producers of honey a substantial saving in cost of operation is provided for.

Other modes of applying the principle of my invention may be employed instead of the one explained, change being made as regards the means and the steps herein disclosed provided those stated by any one of the following claims or their equivalents be employed or embodied therein.

I therefore particularly point out and distinctly claim as my invention:

1. An apparatus of the character described having in combination an extractor frame support, a plurality of knives positioned adjacent the same, and combined operating means for causing relative motion of said frame support and knives and engagement of said knives with the caps of the honey combs of an extractor frame.

2. An apparatus of the character described having in combination an extractor frame support, a plurality of knives positioned adjacent the same, means including flexible conduits for heating said knives, and combined operating means for causing relative motion of said frame support and knives and engagement of said knives with the caps of the honey combs of an extractor frame.

3. An apparatus of the character described having in combination an extractor frame support, a plurality of knives positioned adjacent the same, combined operating means for causing relative motion of said frame support and knives and engagement of said knives with the caps of the honey combs of an extractor frame, and means for rapidly reciprocating said knives while said extractor frame support and knives are moved relative to each other.

4. An apparatus of the character described having in combination a table, a slideway on said table, an extractor frame support movably mounted on said slideway, a pair of uncapping knives positioned adjacent said slideway, means for moving said extractor frame support from a central position on said table toward one end thereof, and back to the opposite end of said table and again to a central position, and means for bringing said extractor knives in contact with the caps on each side of an extractor frame engaged in said support to simultaneously remove the same.

5. An apparatus of the character described having in combination a table, a slideway on said table, an extractor frame support movably mounted on said slideway, a pair of uncapping knives positioned adjacent said slideway, means for moving said extractor frame support from a stationary central position on said table toward one end thereof, and back to the opposite end of said table and again to rest at a central position, and means for bringing said extractor knives in contact with the caps on each side of an extractor frame engaged in said support to simultaneously remove the same.

6. An apparatus of the character described having in combination a table, a slideway on said table, an extractor frame support movably mounted on said slideway, a pair of uncapping knives positioned adjacent said slideway, means for moving said extractor frame support from a central position on said table toward one end thereof, and back to the opposite end of said table and again to a central position, means for reciprocating said uncapping knives, means for changing the angular position of said knives, and means for coordinating the angular motion of said knives with the motion of said extractor frame support.

7. An apparatus of the character described having in combination a table, a slideway mounted on said table, an extractor frame support mounted on said slideway, means mounted beneath said table for reciprocating said frame upon said slideway, a pair of uncapping knives mounted centrally of the path of movement of said extractor frame support, means for reciprocating said knives, and means associated with the driving means for said reciprocating mechanism for changing the angular position of said knives, first in one direction, and then in the opposite direction and then parallel to the plane of said extractor frame support.

8. A method of preparing extractor frames for use in an extractor by removing the caps thereof permitting the conserving of the honey associated with the caps thereof, which comprises the steps of severing the caps on either side of an extractor frame simultaneously by applying sharp edged instruments vertically against the opposite sides thereof and producing relative longitudinal motion between said instruments and said extractor frame and thereafter changing the angular position of said instruments and the direction of longitudinal motion of said extractor frame to remove other portions of the caps of said honey combs within said frames.

9. A method of preparing extractor frames for use in an extractor which includes the step of simultaneously severing the caps on each side of a honey comb within said frame within a portion of said frame with longitudinal motion in one direction and over the remaining portion of said frame with longitudinal motion in the opposite direction, while firmly supporting said frame at the bottom and ends thereof.

Signed by me this 25th day of October, 1927.

WILLIAM T. GRAN.